(12) United States Patent
Meirsman et al.

(10) Patent No.: US 6,636,923 B1
(45) Date of Patent: Oct. 21, 2003

(54) COMMUNICATION BUS SYSTEM WITH PROTOCOL FOR DETECTING PRESENCE OF SLAVE DEVICE

(75) Inventors: Daniel Meirsman, Leuven (BE); Johan K. J. Van Ginderdeuren, Leuven (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/561,295

(22) Filed: Apr. 28, 2000

(30) Foreign Application Priority Data

Apr. 29, 1999 (EP) .............................................. 99201337

(51) Int. Cl.[7] .......................... G06F 13/00; G06F 13/20
(52) U.S. Cl. ...................... 710/305; 710/105; 709/208; 370/420
(58) Field of Search ............................ 710/104, 62, 11, 710/31, 105, 305, 313; 709/220, 253, 208; 703/13, 21; 714/3, 25, 28, 8, 716; 370/402, 420, 466; 713/300

(56) References Cited

U.S. PATENT DOCUMENTS 5,617,418 A * 4/1997 Shirani et al.
5,784,581 A * 7/1998 Hannah
5,991,885 A * 11/1999 Chang et al.
6,098,120 A * 8/2000 Yaotani

OTHER PUBLICATIONS

International Search Report.

* cited by examiner

Primary Examiner—Gopal C. Ray

(57) ABSTRACT

An apparatus can be used as a hub station in a communication bus system that contains a host station connected to a host connector of the apparatus and a slave station connected to a slave connector of the appara tus. In the communication bus system operates according to a communication protocol wherein the hub station generates a presence signal on the host connector upon incorporation of the hub station into the system via the host connector. The presence signal is dependent on whether the hub station detects a slave device connected to the slave connector. The apparatus comprises an alternative host port and a hub circuit operatively connected to the host connector, the slave connector, and the alternative host port. The hub circuit is arranged to pass communication between an alternative host processor and the slave device via the alternative host port and the slave connector, generating the presence signal to simulate absence of a connection to the slave connector when the hub station is incorporated into the system at a time when the alternative host processor uses the slave device connected to the slave connector.

10 Claims, 2 Drawing Sheets

COMMUNICATION BUS SYSTEM WITH PROTOCOL FOR DETECTING PRESENCE OF SLAVE DEVICE

BACKGROUND AND SUMMARY

The invention relates to an apparatus for use in a communication bus system and to a communication bus system. An example of a communication bus system is a USB (Universal Serial Bus) system, discussed for example in U.S. Pat. No. 5,784,581. The USB system provides for communication between a number of slave stations and a host station. The host and slave stations are connected to each other in a tree topology. The host is connected to a number of slave stations and/or a number of hub stations. The hub stations in turn may be connected to further slave stations or further hub stations and so on. Thus, each slave station is connected to the host station either directly or via a number of hub stations.

The host station has a number of slave connectors for connecting slave stations or hub stations. The slave stations each have a host connector for connection to the host station, either directly to a slave connector of the host station or indirectly via one or more hub stations. Each hub station has a host connector and one or more slave connectors. The host connector is for connecting the hub station to a slave connector of the host station either directly or via other hub stations. The slave connectors are for connection to the host connectors of slave stations or other hub stations.

The USB system allows for incorporation of new stations into the system when the system is already running normally (i.e. when it is no longer in an initialization phase). This occurs for example when a user physically connects the host port of a slave station or hub station on one hand to a slave port of a host station or hub station on the other hand. Incorporation also occurs when the user switches on the power to a slave station or hub station later than to other stations. Collectively this will be referred to as "introduction" of a station into the system.

Upon introduction, the station to whose slave port the new station is connected will detect the presence of the new station. This is reported to the host station, which will then incorporate the station into the system, for example by assigning a unique identifier to it, entering it into tables etc. If the new station is a hub station, the host station will cause this hub station to sense signals on its slave connectors to determine whether any active stations are connected to the slave ports. If so, this is signaled to the host processor, which then also incorporates these stations into the system.

The host station controls all communication in the USB system. If the host station is switched off, or even completely absent, no communication is possible in the USB system. This has the disadvantage that slave stations cannot use the USB system in the absence of the host station.

U.S. Pat. No 5,784,581 teaches an apparatus that overcomes this problem. This apparatus is capable of operating both as a host station and as a slave station. The apparatus has both a slave connector and a host connector. As long as the apparatus is not introduced as a slave station into a USB system with its host connector, the apparatus operates as host station to a slave station or stations that are connected to the slave connector. Once the apparatus is incorporated into a USB system as a slave station, it stops operating as a host station. An example of such an apparatus is a video recorder that can communicate as a host station with a camera to record data from the camera under its own control, or function as a slave that records if instructed to do so by a host station. In the latter case, data from the camera passes to the host station from the camera and from the host station to the recorder. In this case the slave port of the apparatus is disabled.

When the apparatus according to U.S. Pat. No. 5,784,581 is connected to the host station, it stops functioning as a host immediately, so that it does not create interference in the communication between its former slaves and the new host station. The slave stations have to be able to report to the new host station within a relatively short time required by the USB protocol. This means that the operation of the apparatus will be interrupted abruptly upon introduction to the USB system of the new host.

SUMMARY OF THE INVENTION

It would be advantageous to provide for a bus communication system that can operate both before and after connection of a new host station without abrupt interruption of communication upon connection of the new host station.

It would also be advantageous to provide for an apparatus that can operate both as a host station and a slave station and that can switch between operation as a host station to its own slave station and as a slave station in its own time.

The apparatus according to the invention is described in Claim 1. The apparatus according to the invention allows the apparatus to be part of more than one independent USB-like communication bus system at the same time. When the apparatus is part of a USB-like communication bus system with a first host station, the apparatus may be introduced into an another USB-like bus communication bus system with another host station. The apparatus has the freedom to decide for at least one of its slave connectors to which host station it assigns that slave connector when the apparatus is introduced into the other USB-like communication bus system. When the slave connector is assigned to one communication bus system, the apparatus supplies the signals (including lack of signals) to the host of the other communication bus system that the apparatus normally generates in response to the absence of a connection to the slave connector.

Preferably the slave connector may be transferred from one communication bus system to a new communication bus system during continued operation of both communication bus systems. The apparatus reports this to the new communication bus system with the signals that the apparatus normally generates in response to connection of a new slave station to the slave connector.

Preferably, the apparatus contains its own host processor that can act as a host station to the slave stations connected directly or indirectly to the slave connector when no other host station is connected to the host connector of the apparatus.

There is a risk that a user will connect a slave connector of the apparatus to its host connector. This may degrade the communication bus system if the apparatus responds as if a different host station has been connected. For example, the apparatus may start waiting for initiatives from the new host that are not forthcoming, because the apparatus itself is the new host. Also signals from the apparatus may cause pseudo conflicts if the apparatus receives back these signals as if they come from a different host station. In the USB protocol the host station assigns an identification code to newly introduced slave stations using the USB enumeration process. When a slave connector is connected to the host connector, the apparatus will transmit a signal to assign an identification code to the slave connector and receive it back on its own host connector.

In principle, each time the apparatus receives a signal to set an identification code after transmitting this kind of signal itself, this may be due to a connection between a slave connector and the host connector. Preferably, the apparatus compares the identification code that it transmits as a host station with identification codes included in signals received simultaneously with the transmission or shortly after the transmission (within the maximum allowable transmission delay of the communication bus system). If the identification codes are equal, it is likely. that the slave connector has been connected to the host connector and in response the apparatus preferably disregards the connection to the slave connector. Of course there is a small possibility that the identification code received at the host connector originated from a different host station even in this case. To reduce the probability that this leads to problems, the apparatus preferably responds to equal identification codes by transmitting a signal assigning another identification code. The slave port is then disregard only if this identification code is also received back.

BRIEF DESCRIPTION OF THE DRAWINGS

These and another advantageous aspects of the invention will be described and illustrated with examples using the following figures.

DESCRIPTION OF THE PREFERRED EMBODIMENT

Figure 1:
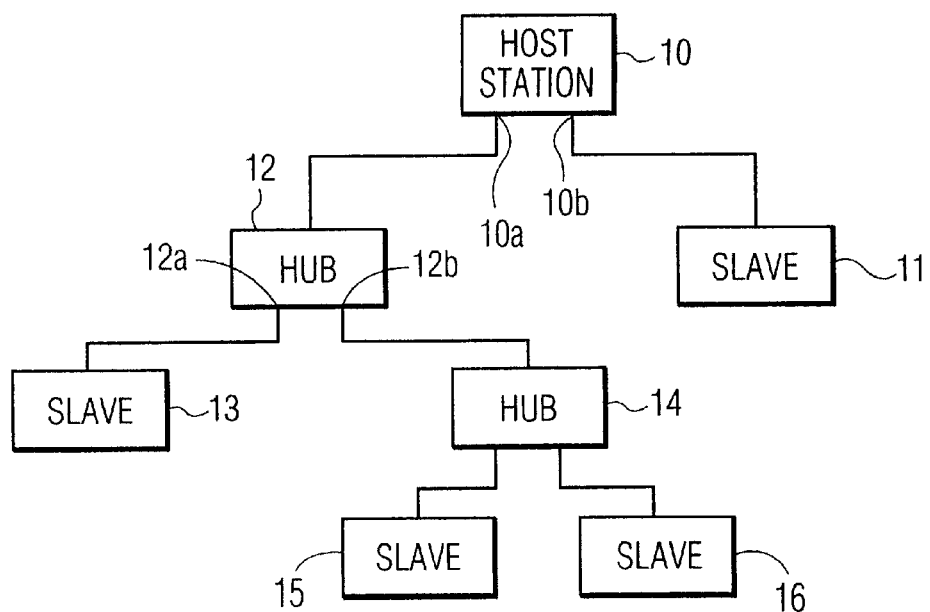
FIG. 1 shows a bus communication system

FIG. 1 shows a typical bus communication system with tree structured connections, such as a USB (Universal Serial Bus) system, which is commonly used to connect PC's (personal computers) to peripheral devices.

The USB bus allows a non-expert user to connect apparatuses in a tree structure of connections. The apparatuses can communicate via the tree structure. An apparatus can be connected no matter whether other apparatuses are already actively connected to the tree structure or not. Similarly, the apparatus can be on or off when it is connected.

At the root of the tree structure is a host station 10 which has one or more USB connectors 10a, b. At the leaves of the tree are slave stations 11, 13, 15, 16. To each of the USB connectors 10a, b of the host station 10 the user can connect either a slave station 11 or a hub station 12. The hub stations 12 in turn also have such USB connectors 12a, b to which slave stations 13, or other hub stations 14 can be connected and so on.

The host station 10 controls communication through the USB bus system. The host station 10 addresses slave stations 11, 13, 15, 16 via the USB connectors 10a, b and via hub stations 12, 14 if necessary. Data is passed between the host station 10 and the addressed slave stations 11, 13, 15, 16, if necessary via the hub stations.

A new station such as a hub station 12, 14 or slave station 11, 13, 15, 16 can be connected to the bus system while the bus system is running. Also, stations 11–16 that are already connected but not yet switched on may be switched on. Collectively, connection of a switched-on station and switch on of a connected station will be referred to as "introducing the station into the system" or more briefly "connection". The process of making the new station accessible in the system that starts with this "connection" will be termed "incorporation into the system".

The host station 10 or hub station 12, 14 to which the new station is connected senses the interaction of the new station. In a USB system this is realized because the new station pulls up a potential on a pin of the USB connector. In response to the introduction, the host station records the presence of the new station and opens a communication channel to read out the type of the new station. If desired, the host station 10 then starts other communication with the new station.

In case the new station is a hub station 12, 14, the host station 10 subsequently causes the new station to activate its USB connectors. As a result, it is possible to detect further stations (hub stations or slave stations) that are connected to these USB connectors. The presence of such a further station is reported back to the host station 10, which then opens up a communication channel to the further station and so on.

Figure 2:
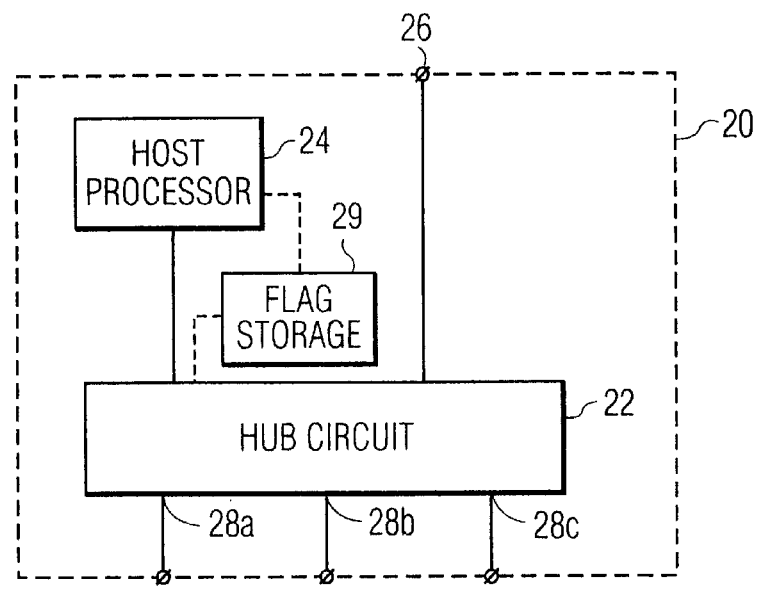
FIG. 2 shows an apparatus for use in a communication bus system

FIG. 2 shows an apparatus 20 according to the invention, for use in a communication bus system, such as a USB (Universal Serial Bus) system. The apparatus 20 contains a hub circuit 22, a local host processor 24, a host connector 26 and slave connectors 28a–c. The hub circuit 22 is connected to the connectors 26, 28a–c and the local host processor 24.

The apparatus 20 is designed to be able to operate with and without a host station connected to the host connector 26. In case a host station connected to the host connector 26, the apparatus can operate as a normal hub station, the hub circuit 22 performing the known functions of the hub station. In case no host station is connected to the host connector 26, the local host processor 24 operates as host processor, communicating with slave stations connected to the slave connectors 28a–c.

When a host station is connected to the host connector 26, the hub circuit 22 is capable of functioning as a pair of hub stations, one hub station connecting the host connector 26 to a number of the slave connectors 28a–c and another hub station connecting the local host processor 24 to different ones of the slave connectors 28a–c. This is realized for example by suitable computer programs loaded in the local host processor 24 for controlling the ports. Thus, two mutually isolated USB systems may be formed, both including the apparatus 20.

Figure 3:
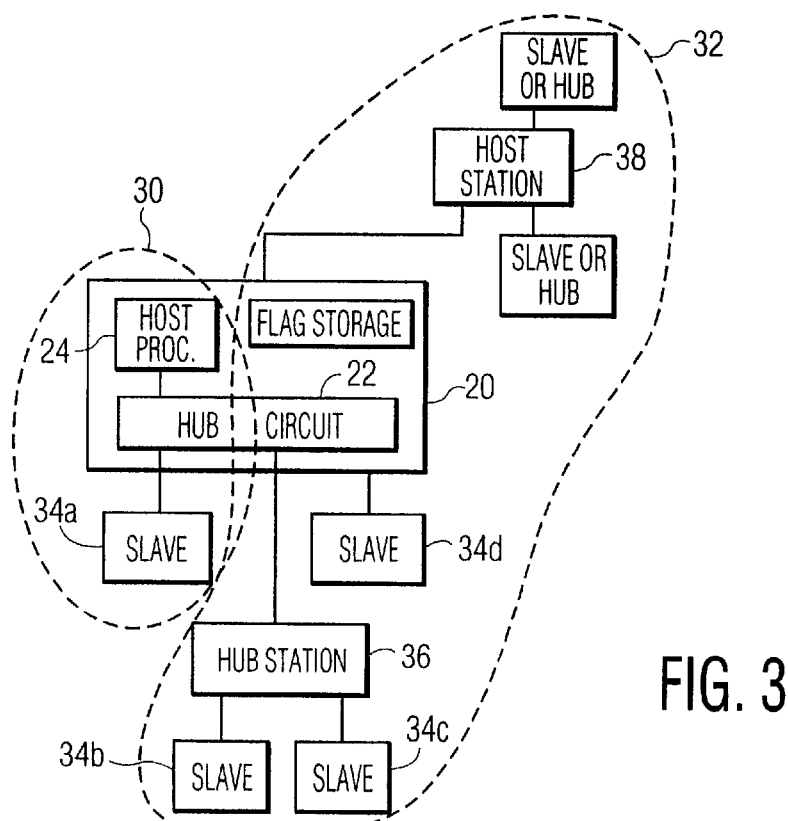
FIG. 3 shows a bus communication system divided into two sub systems

FIG. 3 shows a system logically divided into two mutually isolated USB systems 30, 32, that both include the apparatus 20. The system contains a number of the slave stations 34a–d and hub station 36 connected to slave ports of the apparatus assigned to different ones of the USB systems 30, 32.

Figure 4:
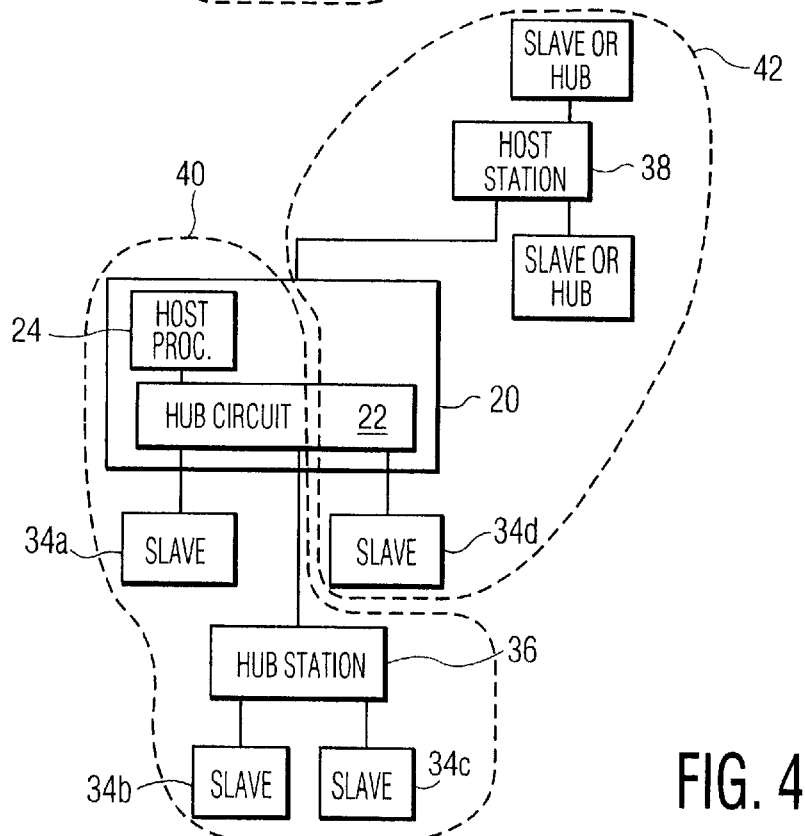
FIG. 4 shows a bus communication system divided into two different sub systems.

FIG. 4 shows the same system logically divided in a different way into two mutually isolated USB systems 40, 42, that both include the apparatus 20. Execution of a control program in apparatus 20 determines which of the slave stations 34a–d and hub station 36 belong to which system.

The selection of which slave connectors 28a–c of the apparatus belong to which of the two isolated USB systems is dynamical: the hub circuit 22 can report the slave connectors 28a–c to the hosts of both USB systems, but for each particular slave connector 28a–c the hub circuit 22 signals to at most one of the hosts that an active station is connected to that slave port 28a–c. Selection of the host to which the presence of the active station is signaled determines the USB system to which that station belongs.

It is possible that, during the time when the local host processor 24 operates as host processor, a new host processor (host station) 38 is connected to the host connector 26 (either directly or via one or more hub stations). In this case, the hub circuit 22 will signal its presence to the new host station 38 connected to the host connector 26, using the normal USE protocol. In response to that signal the new host 38 will instruct the hub circuit 22 to activate the slave ports 28a–c. In response the hub circuit 22 generates signals back to the new host station 38 via the host connector 26. In the normal USB protocol, these signals differentiate between slave ports 28a–c to which an active apparatuses connected and other slave ports 28a–c where this is not the case.

In case of the apparatus of FIG. 2, the slave ports 28a–c may already be in use by the local host processor 24. If so, the signals back from the hub circuit 22 to the new host station 38 simulate that no connection is present to those slave ports 28a–c that are in use by the local host processor 24. As a result, the new host station 38 will not attempt to establish communication through these slave ports 28a–c and the local host processor 24 can continue to communicate via those slave ports 28a–c.

Preferably, the apparatus 20 contains a number of flag storage locations 29 accessible both for the local host processor 24 and the hub circuit 22, to represent whether or not respective ones of the slave connectors are in use by the local host processor 24. The hub circuit 22 reports slave connectors 28a–c to the new host as disconnected if the flags indicate that these slave connectors are in use. The other slave connectors are reported normally, i.e. as connected or disconnected, depending on whether they are physically connected or disconnected respectively.

Preferably, the hub circuit 22 reports to the local host processor 24 that a slave port 28a–c has been disconnected if that slave port is reported normally to the new host. Thus, the local host processor will no longer attempt to start communication with those slave ports 28a–c. This will happen only to those slave ports 28a–c for which the local host processor 24 has indicated that it can suffer such abrupt disconnection without problems, by means of the flag storage locations 29.

Because the local host processor 24 and the hub circuit 22 are internal to the apparatus 20, both can have access to the flag storage locations 29 outside the normal USB communication channels. As an alternative, the local host processor 24 may be located outside the apparatus and be connected to it via a further host connector (not shown) of the apparatus 20. In this case, the local host processor 24 preferably communicates via the USB protocol which slave connectors it uses and which not, or more precisely from which slave connectors the local host processor can tolerate abrupt disconnection.

For this purpose the hub circuit 22 may provide a virtual slave connector, to which the local host processor can send messages to write into the flag storage locations 29 concerning "in use" status of the other slave connectors.

When the local host processor 24 stops using one or more of the slave ports 28a–c, the hub circuit 22 simulates signals back to the new host station as if a connection to those one or more slave connectors 28a–c has just been established. In this case, the new host station will start communication via those slave connectors just as after a connection has been made.

In one embodiment, connection of the new host station is signaled to the local host processor 24 and the local host processor 24 responds to this information by finishing interactions with slaves via the slave connectors 28a–c. The local host processor 24 preferably does this by completing ongoing data transfers and sending such control commands as are necessary for completing processes running on the local host processor 24 and/or the slaves, rather than abruptly terminating all communication. Such a completion generally takes more time than the maximum response time allowed by the USB protocol for slaves to respond to signals from the new host. This is no problem, because the new host will not be expecting responses from any slaves that are used by the local host processor 24, since the hub circuit 22 has simulated absence of such slaves.

Preferably, the hub circuit 22 signals connection of the new host to the local host processor 24 by signaling to the local host processor 24 that a slave has been connected to a virtual slave connector (i.e. a connector that is not physically present in the apparatus 20 or anywhere else). Preferably, the local host processor 24 contains a software driver program for receiving signals from the virtual connector, the software driver program triggering completion of communication with the slave connectors 28a–c.

In one embodiment, the software driver program prompts the human user of the application programs running on the local host processor 24 to terminate or reconfigure such applications, so that the slave connectors 28a–c will be freed for the new host.

There is a risk that one of the slave connectors 28a–c will be connected directly or indirectly to the host connector 26. In a normal USS bus system this is not a problem, because the host processor 10 does not have a host port and hub stations, which do have a host port, never cake any initiative to start communication.

However, in case the local host processor 24 acts as host processor connected to a part of the USB bus system connected to one of the slave connectors 28a–c, a slave connector in that part of the USB bus system may be connected to the host connector 26. In this case, that connection will be reported back to the local host processor 24, which will respond by establishing connections to the newly connected station, i.e. with the apparatus of which the local host processor 24 is itself a part. This is not an immediate problem, because the hub-circuit will simulate that the slave connectors 28a–c that are used by the local host processor 24 are disconnected. As a result no loop connections will be established.

However, on a longer term the connection to the host connector 26 may cause the local host processor 24 to shut down communication to slave connectors 28a–c. In case of a loop connection from one of the slave connectors 28a–c back to the host connector 26 (directly or indirectly via hub stations), this is undesirable because the shut down is unnecessary, there being no new host that will use the slave connectors 28a–c.

To prevent unnecessary shut down, the hub circuit 22 preferably checks whether a loop connection is established. This can be done using a property of the USB protocol. When a station 11–16 is connected to the USB bus, the host station 10 assigns an identification number to the newly connected station. The local host processor 24 will to this in case of a connection (directly or indirectly) to one of the slave connectors 28a–c.

In case of a loop, this identification number will be received back by the hub circuit 22 via the host connector 26. The hub circuit 22 compares the identification numbers received via the host connector 26 with identification numbers transmitted at the same time (or shortly before) by the local host processor 24 via any one of the slave connectors 28a–c. In case these identification number are equal, a potential loop is signaled. In this case, the local host processor 24 transmits a new identification number to the same station as before. If this new identification number is also received back via the host connector it is concluded that there is a loop. The hub circuit then simulates disconnection of the host connector 26 and the local host processor 24 does not shut down communication with the slave connectors 28a–c.

What is claimed is:

1. An apparatus for use as a hub station in a communication bus system that contains a host station connected to a host connector of the apparatus and a slave station connected to a slave connector of the apparatus, the communication bus system operating according to a communication protocol wherein the hub station generates a presence signal on the host connector upon incorporation of the hub station into the system via the host connector, the presence signal being dependent on whether the hub station detects a slave device connected to the slave connector, wherein the apparatus comprises an alternative host port; and a hub circuit operatively connected to the host connector, the slave connector and the alternative host port, the hub circuit being arranged to pass communication between an alternative host processor and the slave device via the alternative host port and said slave connector and to generate the presence signal simulating absence of a connection to the slave connector when the hub station is incorporated into the system at a time when the alternative host processor uses the slave device connected to the slave connector.

2. An apparatus according to claim 1, the protocol providing for the generation of a connection signal on the host connector when the slave device is introduced into the system at the slave connector, the hub circuit being arranged to generate said connection signal when the alternative host processor stops using the slave device later than incorporation of the hub station into the system via the host connector.

3. An apparatus according to claim 1, the protocol providing for the generation of a connection signal on the host connector when the slave device is incorporated into the system at the slave connector, the protocol providing for transmission of an identification code from the host connector or a local host processor to the slave device in response to introduction of the slave device into the system via the slave connector, the apparatus being arranged to compare a first identification code value transmitted by the local host processor to the slave connector with a second identification code value received subsequently from the host connector, and to disregard the incorporation into the system at the host connector upon detection of equality of the first and second identification code value.

4. An apparatus according to claim 3, wherein the local host processor is arranged to transmit a third identification code value upon said detection of equality, the introduction to the system via the host connector being disregarded upon reception of a fourth identification code value equal to the third identification code value from the host connector.

5. An apparatus according to claim 1, including a local host processor, wherein the hub circuit generates a shut-down signal to the local host processor upon detection of the incorporation into the system via the host connector, the local host processor being arranged to respond to said shut-down signal by completing the use of the slave device, and to subsequently generate a signal to the hub circuit that the slave connector is no longer in use.

6. An apparatus according to claim 5, wherein said shut down signal is generated as a connection signal signaling connection of a further slave device to a virtual slave connector of the apparatus.

7. An apparatus according to claim 1, including a local host processor and flag storage, the local host processor setting the flag storage to an in use state or to a not in use state depending on whether the local host processor uses the slave connector or not respectively, the hub circuit testing the state of the flag storage to determine said presence/absence signal.

8. A system comprising at least a first and second communication bus system that both contain a shared hub station, the communication bus systems containing a first and second host station respectively, for incorporating slave stations and controlling communication with the slave stations in the first and second communication bus system respectively, the shared hub station having a slave connector for connecting a slave station, the first and second communication bus system each operating according to a communication protocol wherein the hub station generates a presence signal for the slave connector upon incorporation of the hub station into the relevant system, the presence signal being dependent on whether the shared hub station detects the slave station connected to the slave connector, wherein the shared hub station is arranged to make a selectable assignment of the slave connector to the first or to the second communication bus system, the shared hub station supplying the signals that it normally generates in response to the absence of a connection to the slave connector to the second host station if the shared hub station assigns the slave connector to the first communication bus system.

9. A system according to claim 8, the shared hub station being arranged to switch the assignment to a newly assigned communication bus system of the first and second communication bus system, the shared hub station generating a connection signal corresponding to connection of the slave station to the slave connector when the shared hub station switches the assignment and supplying the connection signal to the host station of the newly assigned communication bus system.

10. A system according to claim 8, the shared hub station being arranged to compare a first identification code value, transmitted via the slave connector upon introduction of a station into the first communication system via the slave connector, with a second identification code value received subsequently from a host connector for connecting the shared hub station to the second communication bus system, and to break off the incorporation into the first communication bus system in response to detection of equality of the first and second identification code value.

* * * * *